United States Patent [19]

Hardy

[11] Patent Number: 4,472,029
[45] Date of Patent: Sep. 18, 1984

[54] INTEGRATED WAVEFRONT COMPENSATOR

[75] Inventor: John W. Hardy, Lexington, Mass.

[73] Assignee: Itek Corporation, Lexington, Mass.

[21] Appl. No.: 353,550

[22] Filed: Mar. 1, 1982

[51] Int. Cl.³ .............................................. G02F 1/29
[52] U.S. Cl. .................................. 350/360; 350/167; 350/500
[58] Field of Search ...................... 350/167, 500, 360; 356/353

[56] References Cited

U.S. PATENT DOCUMENTS 3,230,380 1/1966 Cooke .
3,441,741 4/1969 Cooke .
3,698,010 10/1972 Lee .
3,773,401 11/1973 Douklias et al. .
3,829,219 8/1974 Wyant .
3,904,274 9/1975 Feinleib et al. .
3,923,400 12/1975 Hardy .
3,937,580 2/1976 Kasdan .
3,957,376 5/1976 Charsky et al. .

Primary Examiner—Bruce Y. Arnold
Attorney, Agent, or Firm—Homer O. Blair; Robert L. Nathans; Gerald H. Glanzman

[57] ABSTRACT

An integrated wavefront compensator for an active optics system in which the components for detecting distortions in a wavefront and the components for correcting the detected wavefront distortions are integrated into one unit. The parallel processing channels of the compensator are fabricated simultaneously using simple, solid state components.

10 Claims, 4 Drawing Figures

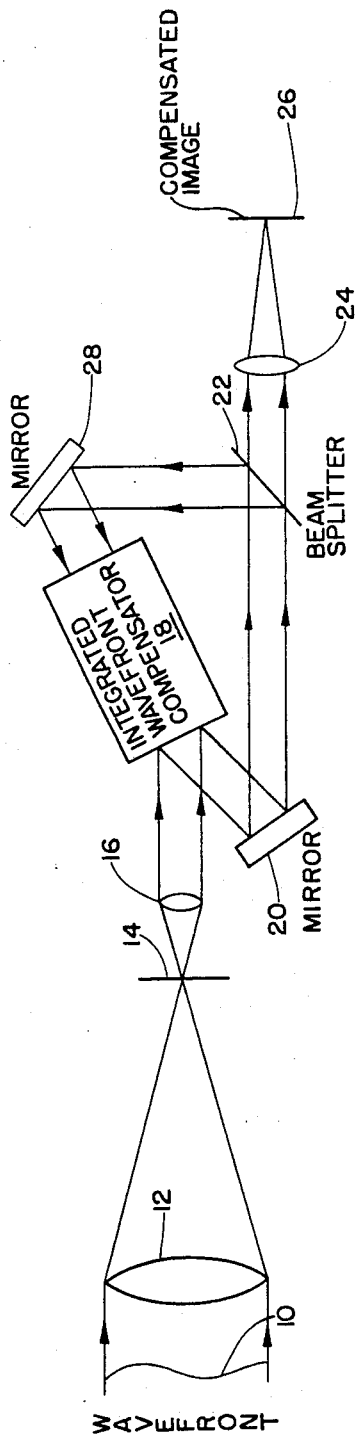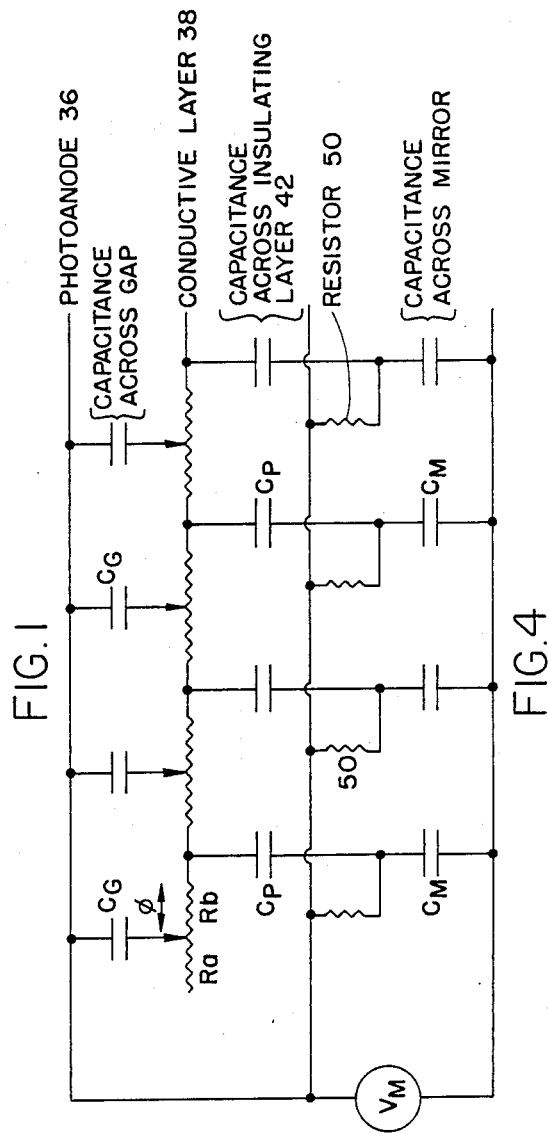

INTEGRATED WAVEFRONT COMPENSATOR

BACKGROUND OF THE INVENTION

1. Field of the Invention

The present invention relates generally to an integrated system for detecting and eliminating in realtime phase distortions in a wavefront, and more particularly pertains to a system of the aforementioned nature in which the components for detecting wavefront distortions and the components for correcting the detected wavefront distortions are integrated into one unit.

2. Discussion of the Prior Art

The resolution of ground based optical imaging systems is severely limited by random wavefront tilts and phase changes produced by atmospheric turbulence. The resolution of such optical systems is usually limited to one or two arc seconds by the atmosphere and may be considerably improved if the atmospheric distortion can be measured and corrected in real-time prior to recording of the image on tape or film.

Present systems for real-time optical wavefront compensation employ discrete components to perform the wavefront sensing and wavefront compensation functions. A system this type is diclosed in Hardy U.S. Pat. No. 3,923,400 for REAL-TIME WAVEFRONT CORRECTION SYSTEM, which is expressly incorporated by reference herein. In the approach disclosed by this patent, a wavefront being imaged is directed onto an AC, lateral shearing interferometer which measures in real time the relative phase differences between different areas of the wavefront. The constructional details of a suitable lateral AC shearing interferometer are disclosed in Wyant U.S. Pat. No. 3,829,219 for SHEARING INTERFEROMETER. The measured phase differences in the form of electrical signals are then directed to a separate analog data processor circuit which generates a second set of electrical signals, the amplitudes of which are proportional to the required phase corrections at the different areas of the wavefront. The second set of signals is then directed to a separate phase corrector element upon which the wavefront is incident to eliminate the relative phase differences therein. One separate phase corrector element disclosed by this patent is a mirror having an array of piezoelectric elements incorporated therein which function to selectively deform the mirror surface to eliminate phase distortions in the wavefront. The constructional details of an active piezoelectric mirror of this nature are disclosed in U.S. Pat. No. 3,904,274 for MONOLITHIC PIEZOELECTRIC WAVEFRONT PHASE MODULATOR.

The approach pursued by the aforementioned prior art results in two severe restrictions on real-time wavefront compensation systems. First, the spatial resolution at which optical wavefronts can be measured and corrected is limited, and secondly the cost and complexity of the system become prohibitive when the number of discrete components exceeds a few hundred. For example, compensation of a four meter astronomical telescope for atmospheric turbulence utilizing the prior art approach would require upwards of one thousand independent actuator channels.

SUMMARY OF THE INVENTION

Accordingly, a primary object of the present invention is to simplify the hardware required to implement wavefront compensation systems by using an integrated component in which large numbers of parallel channels can be fabricated simultaneously. An approach of this nature allows a wavefront to be compensated at high spatial resolution, and also allows large optical apertures to be compensated at a relatively low cost while using simple and solid state components. These components do not require mechanically moving parts and tend to be extremely reliable in operation.

In accordance with the teachings herein, the present invention provides an integrated wavefront compensator in which an input wavefront is divided into a plurality of subapertures to form a separate wavefront image for each subaperture. In this arrangement, the local wavefront slope across each subaperture causes the position of the resultant subaperture image to be displaced in x and y in dependence thereon. Each subaperture image is then transformed by an image intensifier into a corresponding imaged photoelectron charge pattern. An array of electrical nodes is positioned opposite to the photoelectron charge pattern, and capacitively senses the local electrical fields established by the charge pattern. An active mirror also has the input wavefront incident thereon, and is electrically coupled to the array of electical nodes such that it is responsive to the sensed position of the charge pattern to selectively deform a reflective surface thereof to compensate for phase distortions in the input wavefront.

In a preferred embodiment an image intensifier has the wavefront images for all of the subapertures incident on a photocathode face, and produces a corresponding photoelectron charge pattern on a photoanode face. The array of electrical nodes is positioned on an insulating layer, and is spaced thereby from a conductive layer which is in turn spaced from the photoelectron charge pattern, such that the conductive layer is capacitively coupled to the spaced charge pattern, and the array of electrical nodes is capacitively coupled to the conductive layer. The insulating layer is deposited on a substrate, and the conducting layer is in turn deposited on top of the insulating layer. A resistive network is formed on the substrate on its opposite surface, and electrically interconnects the array of electrical nodes.

The array of electrical nodes includes an array of four electrical nodes for each subaperture which are positioned symmetrically around the focal point of a plane wave incident upon the subaperture. In the preferred embodiment a vacuum evacuated tube with transparent windows houses the image intensifier, the conductive layer, the array of conductive nodes, and the active mirror. The photocathode of the image intensifier is responsive to light incident thereon through one window of the tube, and the mirrored surface of the active mirror reflects light incident thereon through an opposite window thereof. An array of lenses is positioned external and generally parallel to the first window, and each lens defines a subaperture and focuses the portion of an incident wavefront received thereacross through the window onto the photocathode positioned therein.

BRIEF DESCRIPTION OF THE DRAWINGS

The foregoing objects and advantages of the present invention for an integrated wavefront compensator may be more readily understood by one skilled in the art with reference being had to the following detailed description of several preferred embodiments thereof, taken in conjunction with the accompanying drawings wherein like elements are designated by identical reference numerals throughout the several drawings, and in which:

FIG. 1 is an optical schematic of an exemplary embodiment of a compensated imaging system utilizing an integrated wavefront compensator constructed pursuant to the teachings of the present invention;

FIG. 4 is a schematic of an equivalent electrical circuit for the integrated wavefront compensator, useful in explaining the operation thereof.

DETAILED DESCRIPTION OF THE DRAWINGS

Figure 3:
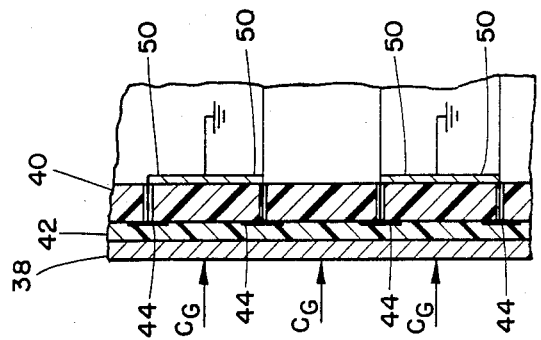
FIG. 3 is an enlarged view of a portion of the wavefront compensator illustrated in FIG. 2.

Referring to the drawings in detail, FIG. 1 is an optical schematic of a compensated, active telescopic imaging system which detects and eliminates in real-time any phase distortions present in an input wavefront 10 incident thereon. An objective lens 12 at the entrance pupil to the telescopic optical system produces a raw image from wavefront 10 of a distant object at the prime focal plane 14 of the optical system. This image may be severely distorted because of random wavefront tilts and phase shifts produced by atmospheric turbulence. In FIG. 1 the telescope is illustrated as a refractive instrument, however, the principles of operation of the present invention work equally well with reflective telescopic optical systems. A relay lens 16 produces an image of the wavefront received at the entrance aperture (at objective lens 12) on a deformable active mirror positioned on a first side of an integrated wavefront compensator 18 constructed pursuant to the teachings of the present invention. The beam reflected by the active mirror is reflected further by fixed mirror 20 through a beam splitter 22 onto a further imaging lens 24 which forms an image at plane 26 which is recorded, as by film or some other recording medium.

Beam splitter 22 reflects a portion of the radiation beam incident thereon to a further fixed mirror 28 which reflects the wavefront onto a second side of the integrated wavefront compensator 18. The second side of the compensator 18 functions to detect the wavefront slope of the input wavefront, which then selectively controls deformation of the active mirror on the opposite side of the compensator to eliminate distortions in the wavefront and produce a compensated image at plane 26.

Figure 2:
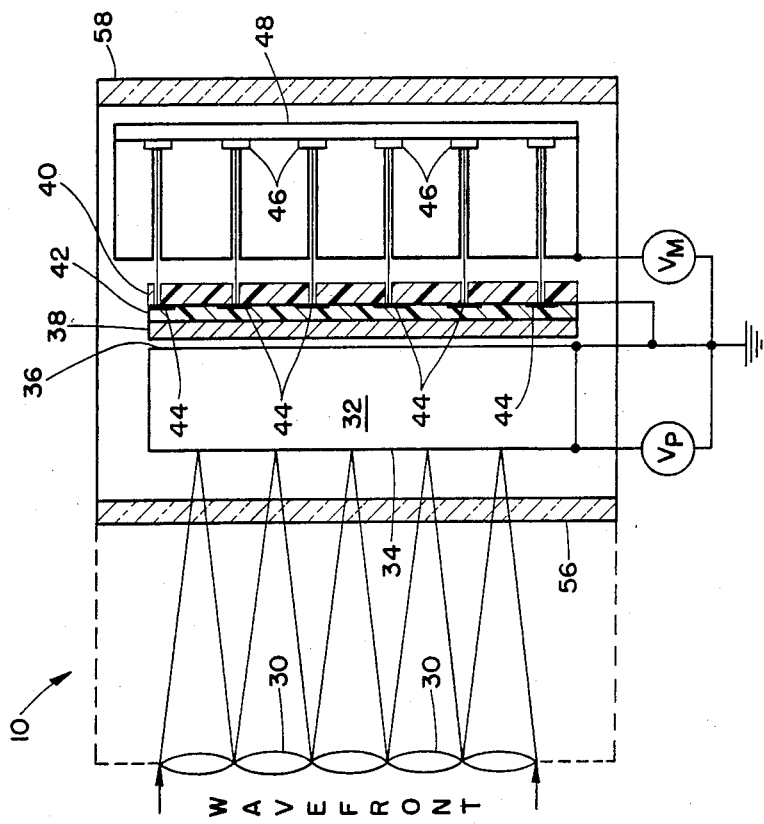
FIG. 2 illustrates a sectional elevational view of an integrated wavefront compensator of the present invention, and depicts essential constructional details thereof.

The integrated wavefront compensator 18 incorporates a number of functionally different components into one integral unit, as illustrated in further detail in FIGS. 2 and 3. Before proceeding further, it should be noted that the compensator in FIGS. 2 and 3 is arranged reversed with respect to that of FIG. 1. In FIGS. 2 and 3 the input wavefront from which the phase distortions are measured is shown on the left, while the active mirror is on the right.

A two dimensional array of lenses 30 (only one column of which is shown for clarity) divides the wavefront into a plurality of subapertures, each of which is examined separately as to the local wavefront slope therein as follows. If the incident wavefront departs from a plane wave, then the local slope across a subaperture causes the position of the subaperture image formed by the lens 30 to be displaced in x and y in dependence upon the x and y slope of the wavefront at that subaperture.

The image produced by each lens of the two dimensional array of lenses is amplified in an image photomultiplier arrangement 32 which produces a charged photoelectron image pattern in response to the image produced by each lens of the two dimensional array of lenses. In this arrangement, the images produced by the two dimensional array of lenses are focused onto a photocathode 34 which emits photoelectrons in proportion to the intensity of the light images focused thereon. The image photomultiplier 32 can be a channel plate or a commercially available image photomultiplier tube in which a voltage Vp is applied across the tube to accelerate the emitted electrons into a photoanode 36, causing a charge accumulation pattern thereon in correspondence with each focused image on the photocathode.

A conductive layer 38 is spaced a slight distance from the charge pattern on the photoanode, which establishes local electric fields in proportion to the charge pattern. The local electric fields are capacitively coupled to the conductive layer 38, as indicated by the capacitors $C_G$ in FIG. 4. The conductive layer 38 has a finite resistance per unit length, and accordingly can also be considered to be a semiconductor layer. In the construction of this unit, a substrate 40 is coated with an insulating layer 42, and the insulating layer 42 is then coated with the conductive or semiconductive layer 38. An array of electrical nodes 44 is placed on the opposite side of the insulating layer 42, and is spaced thereby from the conductive layer 38, which is in turn spaced from the photoanode 36. The arrangement is such that the conductive layer 38 is capacitively coupled to the photoelectron charge pattern on the photoanode 36, shown by capacitors $C_G$ in FIG. 4, and the array of electrical nodes is capacitively coupled to the conductive layer 38, shown by capacitors $C_P$ in FIG. 4.

The array of electrical nodes 44 is such that four nodes are positioned symmetrically around (two in x and two in y) the optical axis of each lens 30. The arrangement is such that when the wavefront imaged by a subaperture lens 30 is plane, the image on the photocathode (and also the resultant photoelectron image on the photoanode) is centered with respect to the optical axis of the lens and the four surrounding nodes such that the electric fields established relative to each of the surrounding four nodes is equal. However, a local wavefront slope across a subaperture lens results in the image on the photocathode (and also the resultant photoelectron image on the photoanode) being shifted off center such that the electric fields established relative to each of the four surrounding nodes are no longer equal. The established electric fields are shifted in both x and y positions in dependence upon the x and y wavefront slope across the subaperture. This shift is shown schematically in FIG. 4 as being similar in concept to a potentiometer, with a shift in position causing the voltage divided by resistances $R_a$ and $R_b$ to be changed in proportion to the shift in the potentiometer pointer.

It is necessary for the voltage applied to each of the actuator nodes 46 of a monolithic piezoelectric mirror 48 mounted at the output or right side of the wavefront compensator to be proportional to the displacement of the photoelectron charge locations and not to the intensity of the image established by each subaperture lens. To this end, the capacitive coupling $C_P$ across the resistance layer 42 provides substantial DC isolation to prevent the intensities of the images on the photocathode from adversely affecting the operation of the compensator. In this arrangement, only changes in the photoelectron charge locations are capacitively coupled by $C_P$ across the insulating layer 42. Changes in a photoelectron charge location, represented symbolically as changes in $Ra$ and $Rb$, change the voltages across the adjoining capacitors $C_P$ and consequently the voltages applied across adjacent actuator nodes 46 of the active piezoelective mirror 48, the capacitance of which is indicated as $C_M$ in FIG. 4. A change in the voltages between adjacent actuators 46 results in a change in the slope of the mirror surface in the corresponding area between the actuators, which has a one to one relationship with the wavefront detector subapertures. The monolithic piezoelectric mirror 48 can be constructed generally in accordance with the principles disclosed and taught in MONOLITHIC PIEZOELECTRIC WAVEFRONT PHASE MODULATOR U.S. Pat. No. 3,904,274, and accordingly a further description thereof is not included herein.

As explained in Hardy U.S. Pat. No. 3,923,400, it is evident that the signals produced at the individual nodes 44 are indicative of relative shifts in phase of the wavefront, and as such are relative, rather than absolute, values. In an optical imaging system the absolute phase of the lightwaves is irrelevant. Thus, one of the phase values (most conveniently the center one) is arbitrarily designated as a reference, and all other phase values are computed relative to the reference. Computation of the wavefront is achieved by the conductive layer which acts as a spatial integrator, summing the two-dimensional array of phase differences to produce the final wavefront values, similar in concept to the resistive summing in FIGS. 6 and 7 of the aforementioned Hardy patent.

A resistive network comprised of resistors 50, one coupled between each node 44 and ground, apply DC bias thereto from a DC voltage VM to maintain a constant voltage on the mirror in the absence of measured wavefront perturbations. The resistance $R_M$ is relatively large to develop a constant long term voltage $V_M$ across the mirror. In summary, the mirror is sensitive to changes in $Ra$ and $Rb$, and insensitive to changes in the voltage $V_G$ across capacitor $C_G$, FIG. 4 (caused by image intensity changes) when the subaperture image is in a null position, as in response to a plane wave. However, off-null changes in $V_G$ caused by variations in image intensity will effect the magnitude of the resultant correction (i.e. the loop gain). Accordingly, the integrated wavefront compensator is most effective in a closed loop system as shown in FIG. 1 so that the residual errors are small.

During construction of the integrated wavefront compensator, the components of the image intensifier can be commercially available items. The array of electrical nodes 44 can be formed on the substrate 40, which can then be coated first with the insulating layer 42 and next with the conductive layer 38. The matrix of resistors 50 can then be connected across the opposite face of the substrate 40, and this assembly on the substrate then positioned and supported such that the conductive layer 38 is capacitively coupled to the photoanode of the image intensifier. The monolithic piezoelectric mirror 48 can be assembled as a separate unit pursuant to the disclosure of U.S. Pat. No. 3,904,274. The nodes of the array 44 are then electrically connected to the actuator nodes of the active mirror, and the two components positioned and supported relative to each other such that the respective nodes are aligned with each other.

The entire assembly constructed as described thus far can be placed in an enclosed housing having a first flat face 56 adjacent to the photocathode of the image intensifier such that light can be transmitted therethrough to the photocathode. A second flat face 58 of the housing is positioned adjacent to the reflective surface of active mirror 48 such that light can be transmitted therethrough and reflected from the active face of the mirror. The housing can then be vacuum evacuated, which is particularly important for the functioning of the image intensifier components. The two dimensional array of lenses 30 can then be mounted exterior to the glass housing such that the photocathode is at the focal plane of the lenses, with the optical axis of each lens aligned with an electrical node 44.

While one embodiment and several variations thereof have been described in detail herein, it should be apparent that many other embodiments and variations are contemplated within the disclosure and teachings of the present invention.

What is claimed is:

1. An integrated wavefront compensator, comprising:
   a. optical imaging means for dividing an input wavefront into a plurality of subapertures and for forming a separate wavefront image for each subaperture, whereby the local wavefront slope across each subaperture causes the position of the subaperture image to be displaced in x and y in dependence upon the x and y local wavefront slope across the subaperture;
   b. means for transforming each separate wavefront image for each subaperture into a correspondingly imaged photoelectron charge pattern;
   c. an array of electrical nodes, positioned opposite said photoelectron charge pattern, for capacitively sensing the local electrical fields established by the position of the charge pattern; and
   d. an active mirror having the input wavefront incident thereon and being electrically coupled to said array of electrical nodes and responsive to the sensed position of the charge pattern indicated thereby for selectively deforming a reflective surface to compensate for phase distortions in the input wavefront.

2. An integrated wavefront compensator as claimed in claim 1, said transforming means including an image intensifier means having the wavefront images for the subapertures incident on a photocathode face and producing a corresponding photoelectron charge pattern on a photoanode face.

3. An integrated wavefront compensator as claimed in claim 1, said array of electrical nodes being positioned on an insulating layer and being spaced thereby from a conductive layer which is spaced from said photoelectron charge pattern such that the charge pattern is capacitively coupled to said conductive layer which is, in turn, capacitively coupled to said array of electrical nodes.

4. An integrated wavefront compensator as claimed in claim 3, said insulating layer being supported by a substrate, and said conducting layer being positioned on top of said insulating layer.

5. An integrated wavefront compensator as claimed in claim 4, including a resistive network formed on said substrate on the surface opposite the substrate surface supporting said insulating layer, said resistive network electrically interconnecting said array of electrical nodes.

6. An integrated wavefront compensator as claimed in claim 1 or 2 or 3, including a resistive network array electrically interconnecting said array of electrical nodes.

7. An integrated wavefront compensator as claimed in claim 1 or 2 or 3, said array of electical nodes including an array of four electrical nodes for each subaperture which are positioned symmetrically around the focal point of a plane wave incident upon the subaperture.

8. An integrated wavefront compensator as claimed in claim 1 or 2 or 3, said optical imaging means including an array of lenses upon which an input wavefront is incident, such that each lens defines a subaperture.

9. An integrated wavefront compensator as claimed in claim 1 or 2 or 3, including a vacuum evacuated transparent housing encompassing said transforming means, said array of electrical nodes and said active mirror, such that the transforming means is responsive to light incident thereon through one face of the transparent housing and the active mirror reflects light incident thereon through a second face of the transparent housing.

10. An integrated wavefront compensator as claimed in claim 9, said optical imaging means including an array of lenses, upon which an input wavefront is incident, positioned outside and adjacent to said transparent housing.

* * * * *